United States Patent

[11] 3,549,113

[72] Inventor Robert J. Pagliuso
5268 Linda Vista Drive, La Canada, Calif. 91011
[21] Appl. No. 729,591
[22] Filed May 16, 1968
[45] Patented Dec. 22, 1970

[54] CAMERA ATTACHMENT FOR TRIPODS
2 Claims, 9 Drawing Figs.

[52] U.S. Cl. .................................................. 248/187
[51] Int. Cl. ............................................... F16m 11/12
[50] Field of Search ....................................... 248/187, 25, 176, 310, 313, 184; 24/211K, 211L, 263.4

[56] References Cited
UNITED STATES PATENTS
936,927 10/1909 McCallum ................... 248/313
1,863,891 6/1932 Zuber .......................... 248/184
2,664,611 1/1954 Shomber ..................... 24/211K
3,356,325 12/1967 Schnase ....................... 248/187

FOREIGN PATENTS
304,376 11/1919 Germany ..................... 248/187

Primary Examiner—Edward C. Allen
Attorney—Hyman Jackman

ABSTRACT: Quick-release means embodied in the top plate of a tripod and having a lever-controlled jaw and an opposite fixed jaw, said jaws having tapered edges that engage a tapered stud in a direction toward said plate, thereby to firmly seat the camera on the plate. Said top plate, when hinged to the tripod and swung to an angular position with the camera secured thereto, safely holds the camera as firmly on the plate when horizontal as when in such angular position.

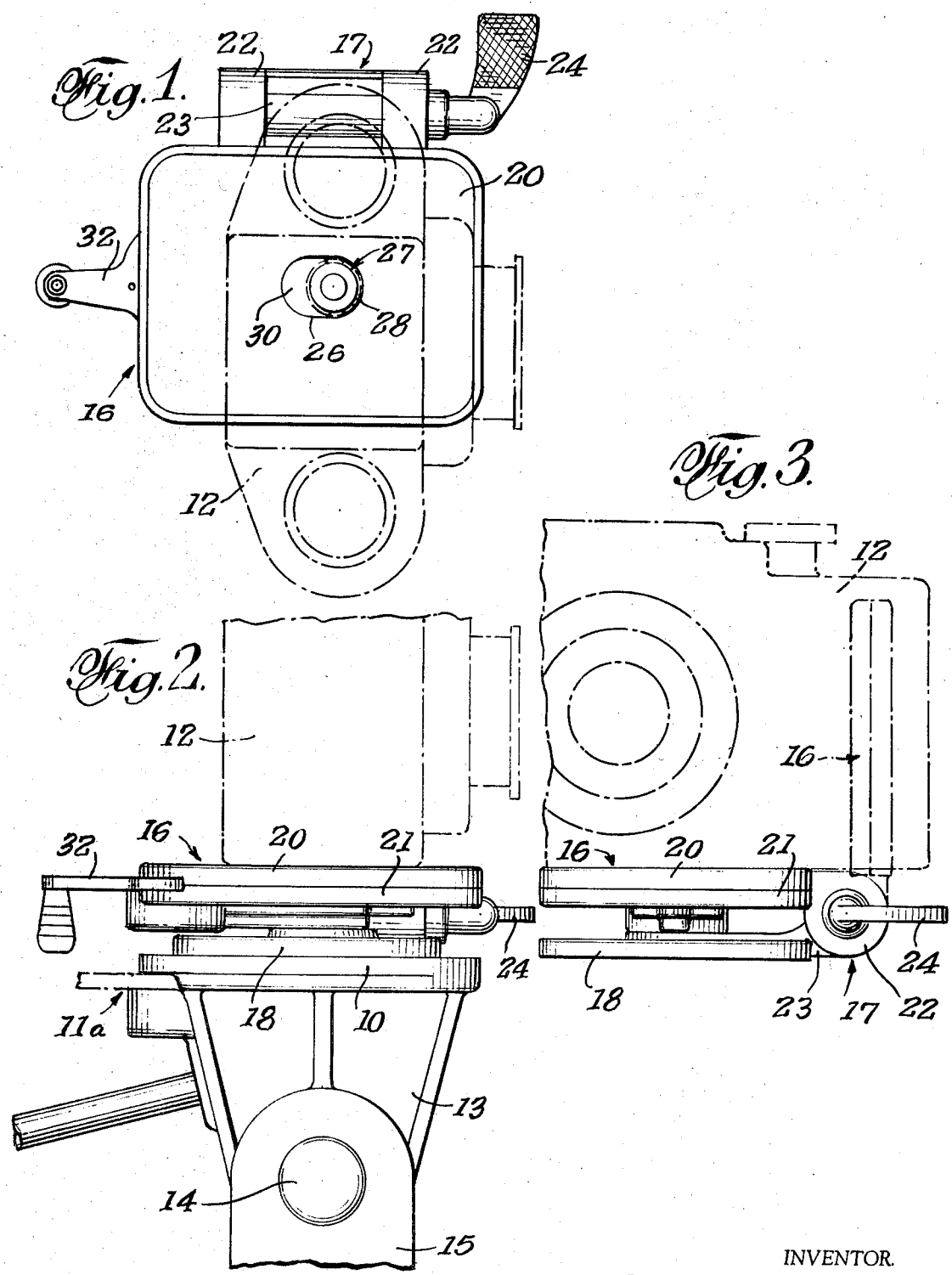

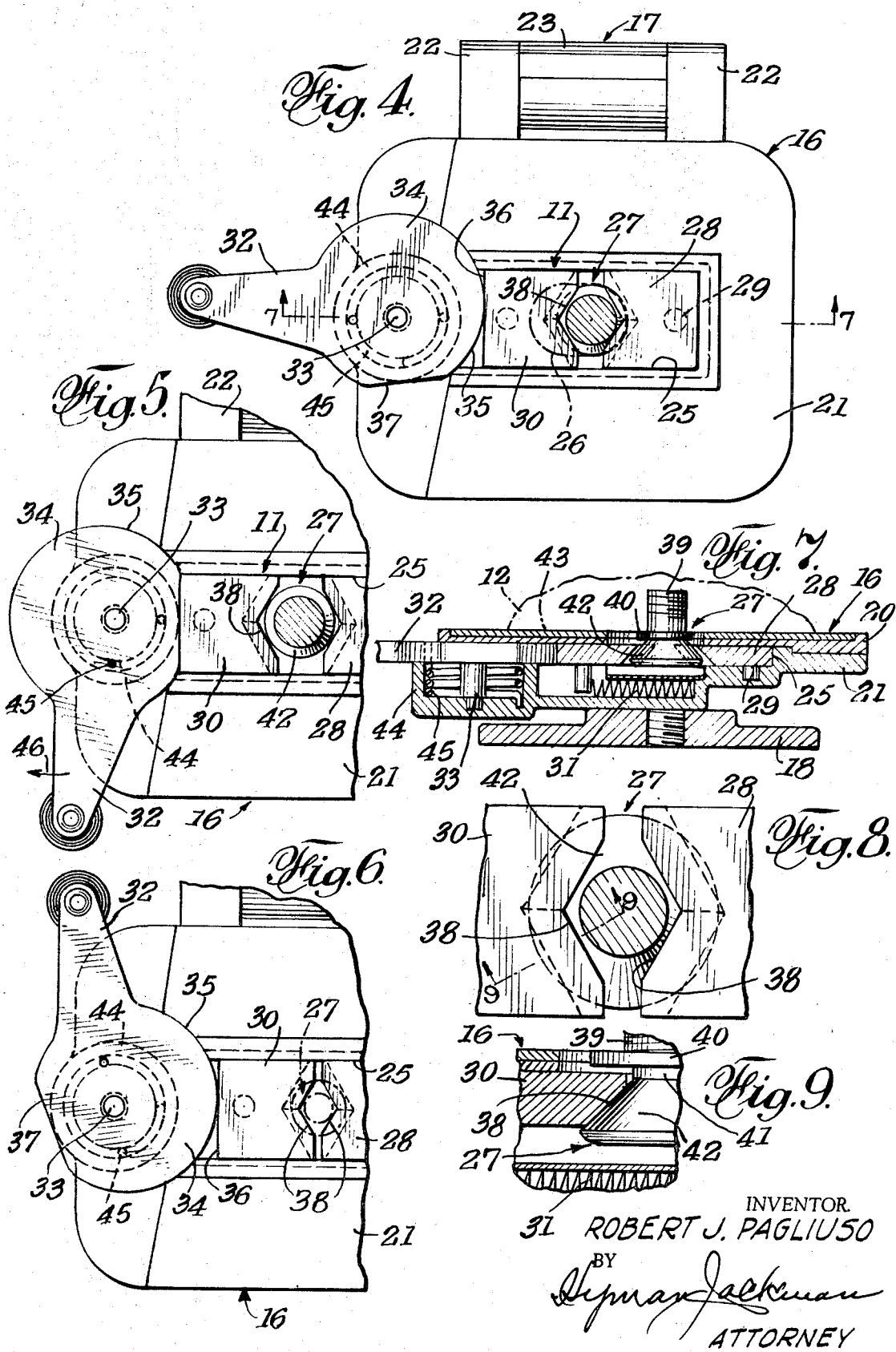

3,549,113

CAMERA ATTACHMENT FOR TRIPODS

BACKGROUND OF THE INVENTION

In the field of photography, tripod mounting of cameras depends for its success upon a sure, fixed and rapid mount and quick release of the camera. The objects of this invention, therefore, are to provide novel and improved means for safely mounting a camera on a tripod with assurance that the attachment will not accidentally release, especially when the tripod is being moved about while being set to picture-taking position; to provide means to mount the camera so the same is nonmovable to any degree relative to the tripod during use; and to provide means for effecting such safe and fixed mounts as well as effecting release of the camera in a simple, rapid and efficient manner.

Heretofore, the common manner of mounting a camera on a tripod entailed the use of a threaded stud on the mounting plate and a socket in the camera case, the camera being mounted on the plate by engaging said stud in the socket. Such a threaded connection is apt to back off and permit the camera to become loosened. The present attaching means is an improvement over such known connection.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, preferred embodiments of the present invention, which are given by way of illustration or example only.

SUMMARY OF THE INVENTION

The camera-mounting plate 10 of a tripod is the member that in the past was provided with the stud above mentioned. According to one form of the invention, said member 10 may be provided with means 11a for connection with a camera 12, as hereinafter described. Such a plate 10 may comprise the top of a bracket 13 that, on a pivot 14, may be adjusted in a vertical plane so the camera may be adjusted accordingly. Said pivot is provided in a swivel 15 that is mounted on the tripod and is adjustable in a horizontal plane so the camera may be panned in addition to being adjusted in a vertical plane.

According to another form of the invention, connection means 11, similar to the means 11a, is embodied in a plate member 16 that, by a hinge 17, is connected to a mounting plate 18 that, in turn, is mounted, as by a stud and seat connection of common design, as above mentioned.

BRIEF DESCRIPTION OF THE DRAWINGS

In the drawings, like reference characters designate similar parts in the several views.

FIG. 1 is a top plan view of the present connection means for mounting a camera.

FIG. 2 is a side elevational view thereof.

FIG. 3 is an edge view.

FIG. 4 is an enlarged plan view with a portion of the plate member removed and the connection means in camera-engaging position.

FIG. 5 is a broken plan view of the parts shown in FIG. 4 with the connection means in release position.

FIG. 6 is a similar view showing a third position of the connection means.

FIG. 7 is a cross-sectional view taken on the plane 7–7 of FIG. 4.

FIG. 8 is a further enlarged and fragmentary plan view of stud-gripping jaws provided in the connection means.

FIG. 9 is a still further enlarged fragmentary sectional view as taken on the line 9–9 of FIG. 8.

DESCRIPTION OF THE PREFERRED EMBODIMENTS

The plate member 16, preferably but not necessarily of rectangular shape, is shown as comprising upper and lower plates, respectively 20 and 21, and which may be connected in any suitable manner. The plate 21 is fixedly joined to the ears 22, and the mounting plate 18 is connected to the part 23 of the hinge between the ears 22. A friction lock, tightened and released by a handle 24, when tightened locks the hinge to hold the plate part 16 at any desired position relative to the plate 16 (two positions being shown in FIG. 3).

The plate 21 is provided with a cavity 25 to house the connecting means 11 and the plate 20 is provided with a clearance hole 26 to allow passage therethrough of a mounting stud 27 that is provided on the camera 12.

The connecting means 11 is shown as a jaw member 28 that, by means of a stud 29 engaged in a hole in the plate 21, is immovably held on said plate against longitudinal movement. At least the side edges of said jaw member are retained by the sidewalls of the cavity against rotative movement. Said means 11 includes a second and oppositely formed jaw member 30 fitted in the cavity 25 against rotative movement and, as shown best in FIG. 7, longitudinally movable in said cavity toward and from the fixed jaw member 27. The jaw member 30 is biased by a spring 31 in a direction away from the jaw member 27.

The connection means 11 further includes a cam lever 32 that is mounted on a pivot pin 33 on the plate 21 and is retained in position by the plate 20, said lever having a cam portion 34, the peripheral edge 35 of which has adjustable engagement with the outer edge 36 of the jaw member 30 against the bias of the spring 31, and a relief edge 37 which, when engaged with said jaw edge 36, releases member 30 for retraction under bias of spring 31.

The two jaw members have their opposed stud-engaging edges 38 similarly but oppositely formed, each edge 38 having a shallow V-form that, from the top surfaces of the jaw members, are formed as oppositely sloping faces that are adapted for contract with the mounting stud 27. The latter element, as best seen in FIGS. 4, 7, 8 and 9, has a threaded shank 39 that is removably engageable in a seat provided in the camera 12, a flange 40 that has flatwise engagement with the camera to cause said shank to tighten in its seat, a shallow neck 41 on the side of said flange opposite to the shank 39, and a frustoconical extension 42 with its small end joined to said neck, thereby forming an undercut circular end that, when engaged between and clamped by the two jaws 28 and 30, is not only tightly gripped but is drawn by the slope of edges 38 in a direction to cause the bottom face 43 to firmly and nonmovably engage the top face of the plate member 16. FIGS. 4, 7 and 9 show such a locked position; FIG. 5 shows a stud-released position due to full retraction of the jaw member 30 and another stud-lock position for accommodating a stud of smaller size.

A housing 44 formed in the plate 21 contains a torsion spring 45 that biases the lever 35 in the direction of arrow 46, thereby turning the lever 32 on its axis 33 toward the stud-locking position of FIG. 4. Counter pressure on the lever 32 is required to maintain the release condition of FIG. 5, since the torsion of spring 45, being greater than the resistance of spring 31, will turn the lever as above indicated to cause the cam edge 35 of the lever to automatically move the jaw member 30 toward the fixed jaw member 28, thereby preventing release of the stud 27 and of the camera to which said stud is affixed. Depending on the size of the stud, the arm is turned clockwise manually, the camming characteristic of said edge 35 with the jaw edge 36 frictionally retaining the locked position of the means 11.

Thus, regardless of the adjusted position of the support plate 16 or the plate 10, the camera is safely held in its clamped position.

The term "camera" in this disclosure and in the appended claims is intended to include such other devices that may use such mounting and connecting means as described herein. It will be clear that the stud comprises an axial member around which the camera, before being clamped by the jaw means, may be turned to a desired position.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

I claim:

1. A camera attachment comprising:
   a. a frustoconical stud adapted for connection to a camera to extend from one wall thereof with the larger end of the stud spaced from said camera wall;
   b. a mounting plate member provided on the upper end of a tripod and having an upwardly facing cavity therein, said cavity having sidewalls;
   c. a pair of cooperating jaw members in said cavity, one fixed and the other guided by the sidewalls of the cavity and longitudinally movable toward and away from the fixed jaw member with one end engageable with the mentioned stud;
   d. means to resiliently bias the movable jaw member away from the fixed jaw member;
   e. a lever pivotally mounted on said plate member and having a cam edge for engaging the other end of the movable jaw member to move the latter, against its resilient bias, to clamp the frustoconical stud when the same is inserted between the jaw members, said lever having a cam relief edge against which the mentioned bias moves the movable jaw member to space said members to receive the stud therebetween; and
   f. a torsion spring being engaged by one end with the mounting plate member and by the other end with the lever, said torsion spring biasing said lever to turn the latter from a position releasing the movable jaw member to a position, against the resilient bias on said movable jaw member, to retain the jaw members in stud engagement until the lever is manually moved to jaw-releasing position against the bias of the torsion spring.

2. A camera attachment comprising:
   a. a frustoconical stud adapted for connection to a camera to extend from one wall thereof with the larger end of the stud spaced from said camera wall;
   b. a mounting plate member provided on the upper end of a tripod and having an upwardly facing cavity therein, said cavity having sidewalls;
   c. a pair of cooperating jaw members in said cavity, one fixed and the other guided by the sidewalls of the cavity and longitudinally movable toward and away from the fixed jaw member with one end engageable with the mentioned stud;
   d. means to resiliently bias the movable jaw member away from the fixed member;
   e. a lever pivotally mounted on said plate member and having a cam edge for engaging the other end of the movable jaw member to move the latter, against its resilient bias, to clamp the frustoconical stud when the same is inserted between the jaw members, said lever having a cam relief edge against which the mentioned bias moves the movable jaw member to space said members to receive the stud therebetween;
   f. the ends of the jaw members that clamp the stud being V-shaped and in opposed relation to fit around opposite sides of the stud, said edges being downwardly and oppositely sloped at an angle to conform to the included angle of the stud, thereby to draw the stud in a direction toward the mounting plate member and the mentioned wall of the camera into tight engagement with said plate member;
   g. a hinge being provided to connect the mounting plate, by one edge thereof, to the tripod, whereby said plate and a camera attached thereto are adapted to be angularly adjusted in a vertical plane, and means to lock said adjustment; and
   h. a torsion spring being engaged by one end with the mounting plate member and by the other end with the lever, said torsion spring biasing said lever to turn the latter from a position releasing the movable jaw member to a position, against the resilient bias on said movable jaw member, to retain the jaw members in stud engagement until the lever is manually moved to jaw-releasing position against the bias of the torsion spring.